United States Patent
Nguyen et al.

(10) Patent No.: US 10,929,062 B2
(45) Date of Patent: Feb. 23, 2021

(54) GRADUALLY THROTTLING MEMORY DUE TO DYNAMIC THERMAL CONDITIONS

(71) Applicant: International Business Machines Corporation, Armonk, NY (US)

(72) Inventors: Hoa C. Nguyen, Austin, TX (US); Bret R. Olszewski, Austin, TX (US); Ram Raghavan, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/182,639

(22) Filed: Nov. 7, 2018

(65) Prior Publication Data
US 2020/0142635 A1    May 7, 2020

(51) Int. Cl.
*G06F 12/00* (2006.01)
*G06F 3/06* (2006.01)
(Continued)

(52) U.S. Cl.
CPC .......... *G06F 3/0659* (2013.01); *G06F 3/0604* (2013.01); *G06F 3/0653* (2013.01); *G06F 3/0673* (2013.01)

(58) Field of Classification Search
CPC .... G06F 3/0659; G06F 3/0673; G06F 3/0653; G06F 3/0604
See application file for complete search history.

(56) References Cited

U.S. PATENT DOCUMENTS

| 5,719,800 A * | 2/1998 | Mittal | G06F 1/32 |
| | | | 713/321 |
| 6,282,663 B1 * | 8/2001 | Khazam | G06F 1/32 |
| | | | 713/320 |

(Continued)

FOREIGN PATENT DOCUMENTS

| WO | 2009025714 A1 | 2/2009 |
| WO | 2009120620 A2 | 10/2009 |

OTHER PUBLICATIONS

Liu et al., "Hardware/Software Techniques for DRAM Thermal Management" in Proceedings of the 17th IEEE International Symposium on High Performance Computer Architecture (HPCA), 2011, 11 pages.

*Primary Examiner* — Mark A Giardino, Jr.
(74) *Attorney, Agent, or Firm* — Cantor Colburn LLP; David Quinn

(57) ABSTRACT

Embodiments of the present invention facilitate gracefully degrading performance while gradually throttling memory due to dynamic thermal conditions. An example method includes receiving, by pre-fetch throttling logic, a pre-fetch command requesting data from a memory and a priority level of the pre-fetch command. The priority level of the pre-fetch command indicates a likelihood that data requested by the pre-fetch command will be utilized by a processor. Thermal condition data from one or more sensors is received by the pre-fetch throttling logic. It is determined whether the pre-fetch command should be issued to the memory. The determining is based at least in part on the priority level of the pre-fetch command and the thermal condition data. The pre-fetch command is issued to the memory or prevented from being issued to the memory based at least in part on determining on the determining.

20 Claims, 4 Drawing Sheets

(51) Int. Cl.
*G06F 13/00* (2006.01)
*G06F 13/28* (2006.01)

(56) References Cited

U.S. PATENT DOCUMENTS

| | | | |
|---|---|---|---|
| 6,961,847 B2 * | 11/2005 | Davies | G06F 1/3203 |
| | | | 712/229 |
| 7,051,221 B2 * | 5/2006 | Clabes | G06F 9/3885 |
| | | | 713/320 |
| 7,627,742 B2 * | 12/2009 | Bose | G06F 1/3203 |
| | | | 712/205 |
| 8,489,146 B2 | 7/2013 | Burns et al. | |
| 9,171,585 B2 | 10/2015 | Rajan et al. | |
| 9,342,443 B2 | 5/2016 | Walker et al. | |
| 9,671,767 B2 | 6/2017 | Nafziger et al. | |
| 2006/0122805 A1 | 6/2006 | Coulson et al. | |
| 2009/0199190 A1 * | 8/2009 | Chen | G06F 9/383 |
| | | | 718/102 |
| 2010/0211745 A1 * | 8/2010 | Jeddeloh | G06F 12/0862 |
| | | | 711/137 |
| 2011/0113199 A1 * | 5/2011 | Tang | G06F 12/0862 |
| | | | 711/130 |
| 2012/0084343 A1 * | 4/2012 | Mir | H04L 29/12066 |
| | | | 709/203 |
| 2013/0246708 A1 * | 9/2013 | Ono | G06F 12/0862 |
| | | | 711/122 |
| 2014/0108740 A1 * | 4/2014 | Rafacz | G06F 12/0862 |
| | | | 711/137 |
| 2014/0281311 A1 * | 9/2014 | Walker | G06F 12/023 |
| | | | 711/162 |
| 2016/0320971 A1 * | 11/2016 | Postavilsky | G06F 3/0604 |
| 2017/0285944 A1 * | 10/2017 | Wang | G06F 3/061 |
| 2017/0300263 A1 | 10/2017 | Helmick | |
| 2017/0344309 A1 | 11/2017 | Balakrishnan et al. | |
| 2017/0351308 A1 | 12/2017 | Rangarajan et al. | |
| 2018/0024929 A1 * | 1/2018 | Greiner | G06F 12/0862 |
| | | | 711/137 |
| 2018/0260152 A1 | 9/2018 | Bar et al. | |

\* cited by examiner

GRADUALLY THROTTLING MEMORY DUE TO DYNAMIC THERMAL CONDITIONS

BACKGROUND

Embodiments of the present invention relate in general to computer memory, and more specifically to a method to gracefully degrade performance while gradually throttling memory due to dynamic thermal conditions.

When the thermal conditions inside a computer system reach a predetermined high limit, actions can be taken to reduce the thermal load within the system. On systems with large memory configurations, the memory modules typically consume a significant fraction of the system power. One way to reduce the thermal load is to throttle the memory in order to reduce the amount of power consumed by the memory.

Memory throttling is often performed by inserting no-operation instructions (no-ops) into the memory command stream to reduce the number of memory accesses within a particular time frame. Another contemporary method of throttling memory is to stop performing pre-fetch commands. This bi-model throttling design for reducing the thermal load where pre-fetching is either enabled or disabled can potentially reduce system performance in a sudden and noticeable way.

SUMMARY

Embodiments of the present invention include methods, systems, and computer program products for gradually throttling memory due to dynamic thermal conditions. A non-limiting example method includes receiving, by pre-fetch throttling logic, a pre-fetch command requesting data from a memory and a priority level of the pre-fetch command. The priority level of the pre-fetch command is selected from a plurality of priority levels and assigned to the pre-fetch command based at least in part on a likelihood that data requested by the pre-fetch command will be utilized by a processor. Thermal condition data from one or more sensors is received by the pre-fetch throttling logic. It is determined, by the pre-fetch throttling logic, whether the pre-fetch command should be issued to the memory. The determining is based at least in part on the priority level of the pre-fetch command and the thermal condition data. The pre-fetch command is issued to the memory based at least in part on determining that the pre-fetch command should be issued to the memory. The pre-fetch command is prevented from being issued to the memory based at least in part on determining that the pre-fetch command should not be issued to the memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
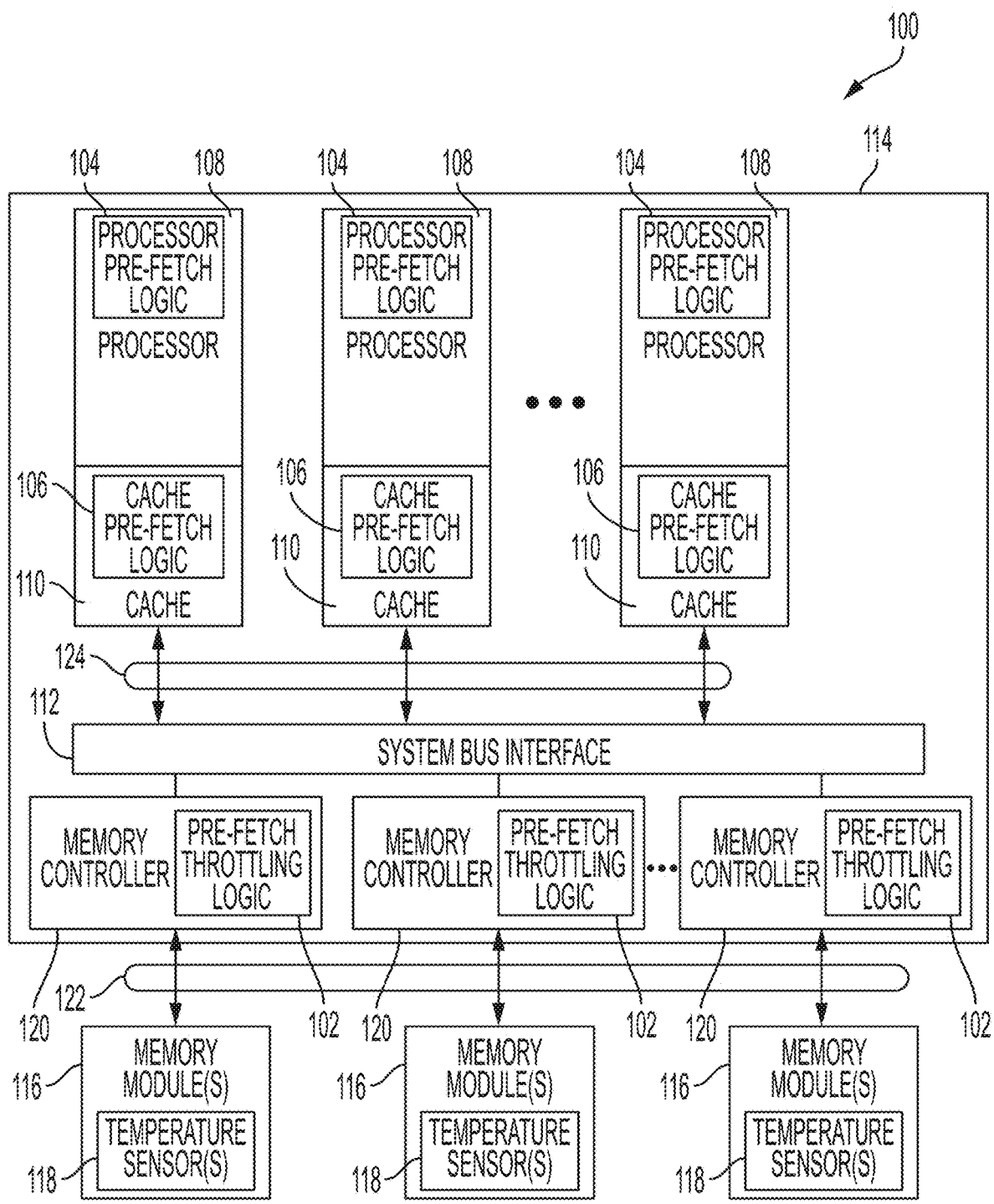
FIG. 1 depicts a system for gradually throttling memory due to dynamic conditions in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Embodiments of the present invention gracefully degrade system performance while gradually throttling memory based at least in part on dynamic thermal conditions. Workloads that generate high memory traffic depend on fast memory response times when retrieving demand loads, which are those that the requesting core requires to make further progress in processing the workload. In contrast, pre-fetch commands request data in anticipation of the requesting core needing the data at a future point in time. In accordance with one or more embodiments of the present invention, as a thermal condition starts to move towards an upper limit, the memory will continue to service the demand loads but will start gradually dropping pre-fetch commands to the memory until the final thermal limit is reached, at which point all pre-fetch commands are dropped. By slowly reducing the number of commands going to memory, one or more embodiments of the present invention can potentially keep the highest thermal limit from being reached for a longer period of time, or may even prevent the highest thermal limit from being reached altogether, while at the same time allowing the system performance to degrade at a reasonable rate.

In accordance with one or more embodiments of the present invention, multiple thermal levels corresponding to increasing thermal levels that are measured by sensors located on the system are set. As the thermal level of the system increases, pre-fetch command throttling becomes increasingly aggressive. Pre-fetch commands can have a priority based at least in part on a likelihood that the pre-fetched data will be used by the requesting core. In accordance with one or more embodiments of the present invention, each thermal level corresponds to a different pre-fetch priority, and as the thermal conditions reach higher levels, pre-fetch commands having higher priorities are dropped and prevented from being issued to the memory. In accordance with one or more embodiments of the present invention, as the system approaches thermal limits, the pre-fetch mechanism is tuned to reduce the aggressiveness of pre-fetch. At a highest thermal limit, pre-fetch commands of all priority levels are altogether dropped. In accordance with one or more embodiments of the present invention, the pre-fetch throttling described herein overrides any user selected hardware pre-fetch options.

As used herein, the term "thermal condition" refers to a measure of heat, such as temperature which is measured using thermal sensors. In accordance with one or more embodiments of the present invention, the thermal condition data includes temperature readings measured by temperature sensors.

One or more embodiments of the present invention provide a technological improvement over contemporary methods that implement a bi-modal throttling design where memory pre-fetching is either turned on or off. A disadvantage of only having two modes is that the performance of the system can be impacted in an abrupt manner. Another disadvantage of contemporary approaches is that they don't include memory pre-fetch throttling actions that attempt to avoid high thermal conditions. One or more embodiments of the present invention include multiple levels of memory pre-fetch throttling that slowly reduce the number of commands going to memory. This can lead to potentially keeping the highest thermal limit from being reached for a longer period of time, or may even prevent the system from reaching the highest thermal limit altogether, while at the same time allowing the system performance to degrade gracefully.

Turning now to FIG. 1, a system 100 for gradually throttling memory due to dynamic thermal conditions is generally shown in accordance with one or more embodiments of the present invention. The system 100 shown in FIG. 1 includes an integrated circuit 114 that includes a plurality of processors 108 and their associated caches 106, a system bus interface 112, and a plurality of memory controllers 120 for communicating with memory modules 116 via busses 122. The processors 108 shown in FIG. 1 may be implemented by any processors known in the art such as, but not limited to graphics processing units and cores. There can be any number of processors 108 (one or more) located on the integrated circuit 114. The processors 108 include a processor pre-fetch logic 104 for generating pre-fetch commands for pre-fetching data that has a likelihood of being utilized in the future. Similarly, the caches 110 may also include cache pre-fetch logic 106 for generating pre-fetch commands for pre-fetching data that has a likelihood of being utilized in the future. Any pre-fetching algorithms and methods known in the art can be implemented by the processor pre-fetch logic 104 and the cache pre-fetch logic 106 shown in FIG. 1. As shown in the embodiment of FIG. 1, the pre-fetch commands are communicated from the processors 108 and caches 110 to system bus interface 112 via one or more busses 124. Pre-fetch throttling logic 102 located on the memory controllers 120 receive the pre-fetch commands from the system bus interface 112.

In accordance with one or more embodiments of the present invention, a priority level is assigned to each pre-fetch command by the processor 108 or the cache 110. The priority level is an indication of the likelihood that the data requested by the pre-fetch command will be utilized by the processor 108. The priority level can include a plurality of levels of increasing likelihood. For example, there may be four priority levels, with a first level reflecting data least likely to be used (e.g., a 20% chance), a second level reflecting a higher likelihood (e.g., a 45% chance) than the first level of being used, a third level reflecting a higher likelihood (e.g., a 70% chance) than the second level of being used, and a fourth level reflecting a higher likelihood (e.g. a 90% chance) than the third level of being used. The number of levels and percentages are only intended to be examples, as exemplary embodiments of the present invention can implement more or fewer levels than four having different percentages. The percentages assigned to each priority level can be programmable based for example, on environmental, processor and/or workload characteristics.

There can be any number of memory controllers 120 (one or more) located on the integrated circuit 114. The memory controllers 120 communicate with the memory modules 116 via busses 122. Pre-fetch commands may be issued to the memory modules 116 by the memory controllers 120 and pre-fetch data from the memory modules 116 received at the memory controllers 120. The memory controllers 120 shown in FIG. 1 includes pre-fetch throttling logic 102 to throttle the issuing of pre-fetch commands to the memory modules 116 based on thermal conditions and priority levels of the pre-fetch commands. As shown in FIG. 1, data from temperature sensors 118 located on the memory modules 116 are transmitted to the pre-fetch throttling logic 102 on the memory controllers 120 via busses 122. In one or more embodiments of the present invention, links (not shown) that are separate from busses 122 are used to transmit the data from the temperature sensors to the memory controllers 120.

The memory modules 116 may be implemented by any memory modules known in the art such as, but not limited to, dual in-line memory modules (DIMMs) and single in-line memory modules (SIMMs). As is known in the art, memory devices are attached to the memory modules 116. The memory devices may be implemented by any type of memory known in the art such as, but not limited to dynamic random access memory (DRAM), flash memory, and/or static random access memory (SRAM).

Temperature sensor(s) 118 are examples of thermal condition sensors. In accordance with one or more embodiments of the present invention, the temperature sensors 118 are placed in a variety of locations on or near the memory to measure temperature. Each temperature sensor 118 may include a number of sensors that each are triggered based on a specified temperature being reached. For example, a temperature sensor 118 may include five sensors: S0 triggered based on the memory module 116 reaching a base temperature, S1 triggered based on a memory module 116 reaching a first temperature higher than the base temperature, S2 triggered based on a memory module 116 reaching a second temperature higher than the first temperature, S3 triggered based on a memory module 116 reaching a third temperature higher than the second temperature, and S4 triggered based on a memory module 116 reaching a fourth temperature higher than the third temperature. In accordance with one or more embodiments of the present invention, each sensor within temperature sensor 118 triggers a level signal when the temperature limit for that sensor is reached and it will remain high as long as that condition is in effect. For example, when S1 is triggered high, S0 will continue to remain high. The number of levels and percentages are only intended to be examples, as exemplary embodiments of the present invention can implement more or fewer levels than four having different percentages. The percentages assigned to each priority level can be programmable based for example, on environmental, processor and/or workload characteristics.

Though not shown in FIG. 1, one or more embodiments of the present invention include temperature sensors 118 located on the integrated circuit 114 (e.g., on or near the processors 108 and/or caches 110 and/or memory controllers 120) that are coupled via busses 124 or another link to the pre-fetch throttling logic 102 in the memory controllers 120. In this manner, thermal conditions detected on the integrated circuit 114 can be used to prevent pre-fetch data from being issued to the memory controllers by the processor pre-fetch logic 104 and cache pre-fetch logic 106. This may result in a reduction of temperatures on the integrated circuit 114.

Figure 2:
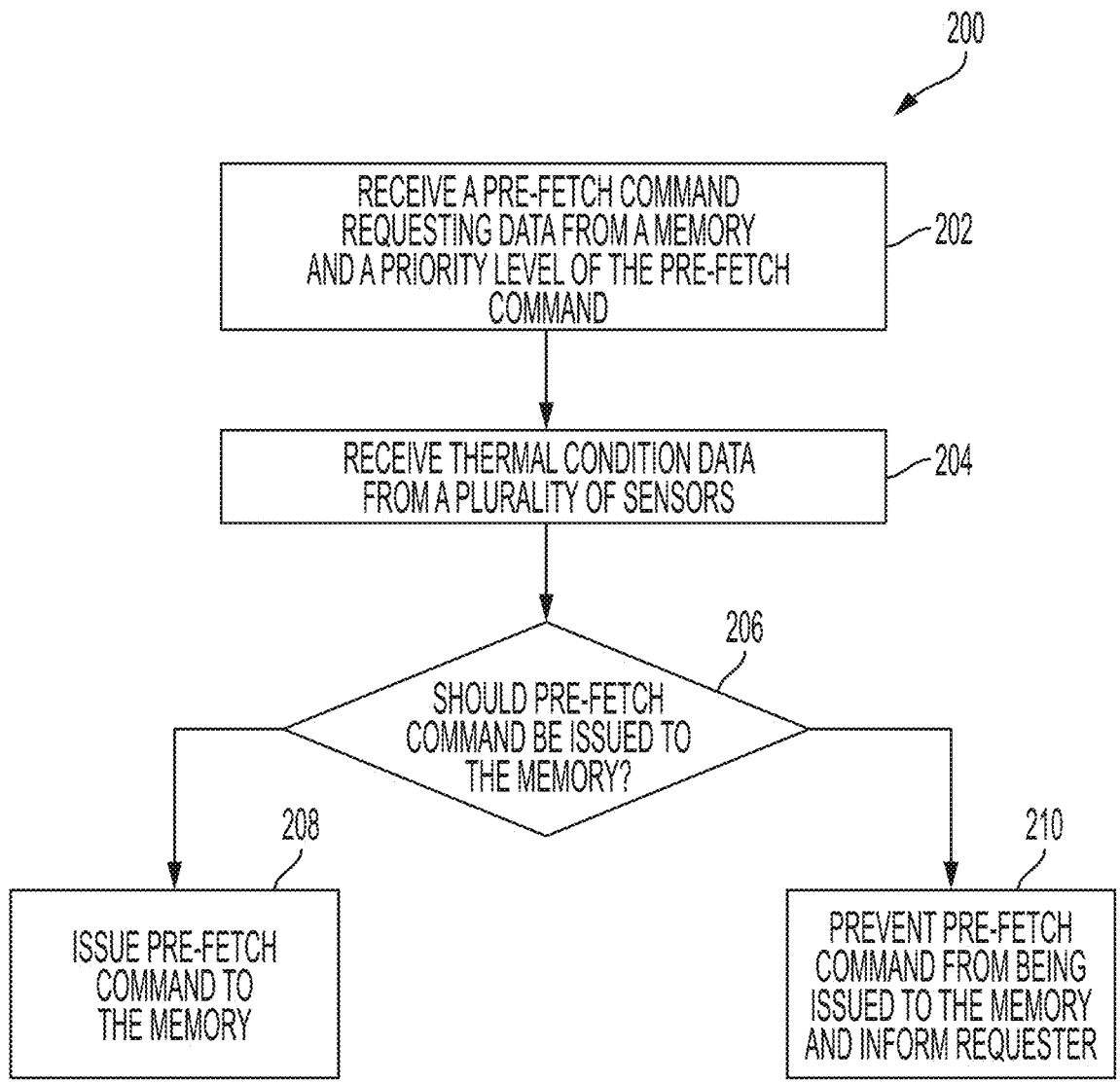
FIG. 2 depicts a flow diagram of a process for gradually throttling memory due to dynamic conditions in memory in accordance with one or more embodiments of the present invention.

Turning now to FIG. 2, a flow diagram 200 of a process for gradually throttling memory due to dynamic conditions in memory is generally shown in accordance with one or more embodiments of the present invention. The processing shown in FIG. 2 can be implemented by pre-fetch throttling logic such as pre-fetch throttling logic 102 of FIG. 1. The pre-fetch throttling logic can be implemented by software and/or hardware instructions being executed by a computer. At block 202, a pre-fetch command requesting data from a memory, such as memory module 116 of FIG. 1, and a priority level of the pre-fetch command are received at the pre-fetch throttling logic. The priority level of the pre-fetch command is selected from a plurality of priority levels that each indicate a likelihood that data requested by the pre-fetch command will be utilized after it is fetched. At block 204, thermal condition data is received from one or more thermal condition sensors, such as temperature sensor 118 of FIG. 1.

At block 206, it is determined whether the pre-fetch command should be issued to the memory. The determining is based at least in part on the priority level of the pre-fetch command and the thermal condition data. As described previously, one or more embodiments of the present invention implement multiple thermal limits that go from low to high, with high being the worst (e.g., hottest) condition. For example, four thermal limits L1 to L4 can be implemented that are recognized by a set of four thermal sensors S1 to S4. Each thermal sensor triggers a level signal when the thermal limit for that sensor is reached and remains high as long as that condition is in effect. In accordance with one or more embodiments of the present invention, if Lx is reached, then Sx will be triggered high, where x is 1, 2, 3, or 4. In accordance with one or more embodiments of the present invention: if S1 is high, then the system stops servicing lower priority 0 pre-fetches (i.e., they are dropped); if S2 is high, then the system stops servicing priority 1 and priority 0 pre-fetches; if S3 is high, then the system stops servicing priority 2, priority 1, and priority 0 pre-fetches; and if S4 is high, then all prefetches at all priority levels are dropped and the system starts inserting no-ops into the command stream to the memory and services the demands at a slow rate. In this manner, as the system approaches thermal limits, the pre-fetch mechanism is tuned to reduce the aggressiveness of the pre-fetch, and as the thermal conditions reach S4, the processors essentially discontinue prefetching altogether.

At block 208 of FIG. 2, the pre-fetch command is issued to the memory based at least in part on determining at block 206 that the pre-fetch command should be issued to the memory. At block 210, the pre-fetch command is prevented from being issued to the memory based at least in part on determining at block 206 that the pre-fetch command should not be issued to the memory. In addition, the requestor of the pre-fetch is informed that the pre-fetch command was not issued.

Figure 3:
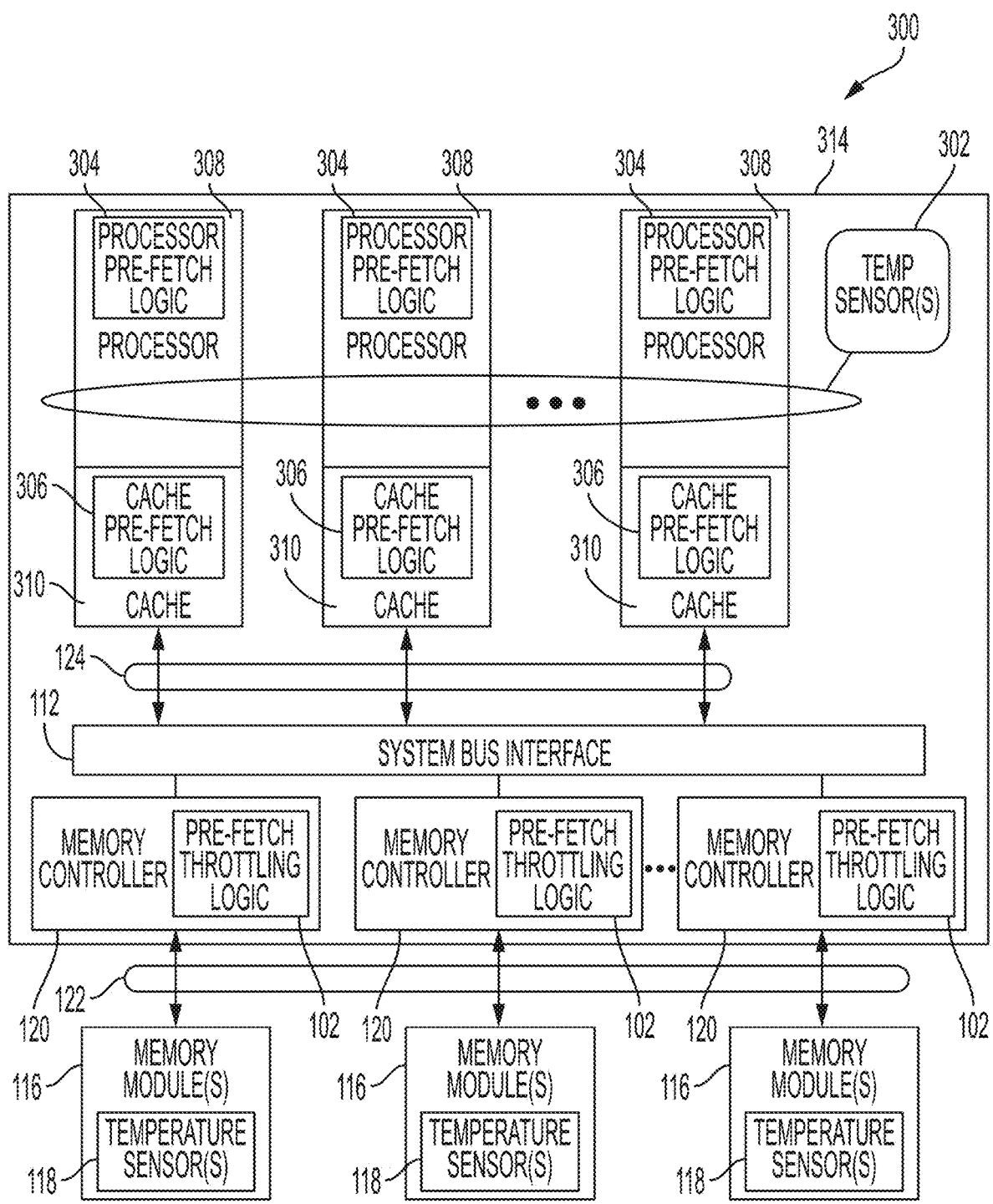
FIG. 3 depicts a system for gradually throttling memory due to dynamic conditions in accordance with one or more embodiments of the present invention.

Turning now to FIG. 3, a system 300 for gradually throttling memory due to dynamic conditions is generally shown in accordance with one or more embodiments of the present invention. The system 300 shown in FIG. 3 includes temperature sensors 302 located on or near the processors 308 and/or caches 310. The data from the temperature sensors 302 can be sent to the processor pre-fetch logic 304 and/or cache pre-fetch logic 306 via an internal path on the integrated circuit 314. In the embodiment shown in FIG. 3, the processors 308 and/or caches 310 can detect that they are moving towards adverse thermal conditions and can start throttling pre-fetch commands (e.g., by not sending them to the memory controller 120).

The system 300 shown in FIG. 3 includes an integrated circuit 314 that includes a plurality of processors 308 and their associated caches 306, a system bus interface 112, and a plurality of memory controllers 120 for communicating with memory modules 116 via busses 122. The processors 308 include processor pre-fetch logic 304 that in the embodiment shown in FIG. 3 includes all or a subset of the pre-fetch throttling logic described above with reference to FIG. 2. In the embodiment shown in FIG. 3, the processors 308 can avoid sending pre-fetch commands to the memory controller 120 when the integrated circuit 314 is moving towards adverse thermal conditions. This can result in slowing down the progression to a high thermal condition (e.g., temperature over a limit) by not using processor power to generate and transmit the pre-fetch commands to the memory controller 120.

Similarly, the caches 310 shown in FIG. 3 cache processor pre-fetch logic 306 that in the embodiment shown in FIG. 3 includes all or a subset of the pre-fetch throttling logic described above with reference to FIG. 2. In the embodiment shown in FIG. 3, the caches 310 can avoid sending pre-fetch commands to the memory controllers 120 when the integrated circuit 314 is moving towards adverse thermal conditions. This can result in slowing down the progression to a high thermal condition (e.g., temperature over a limit) by not using cache power to generate and transmit the pre-fetch commands to the memory controllers 120.

Figure 4:
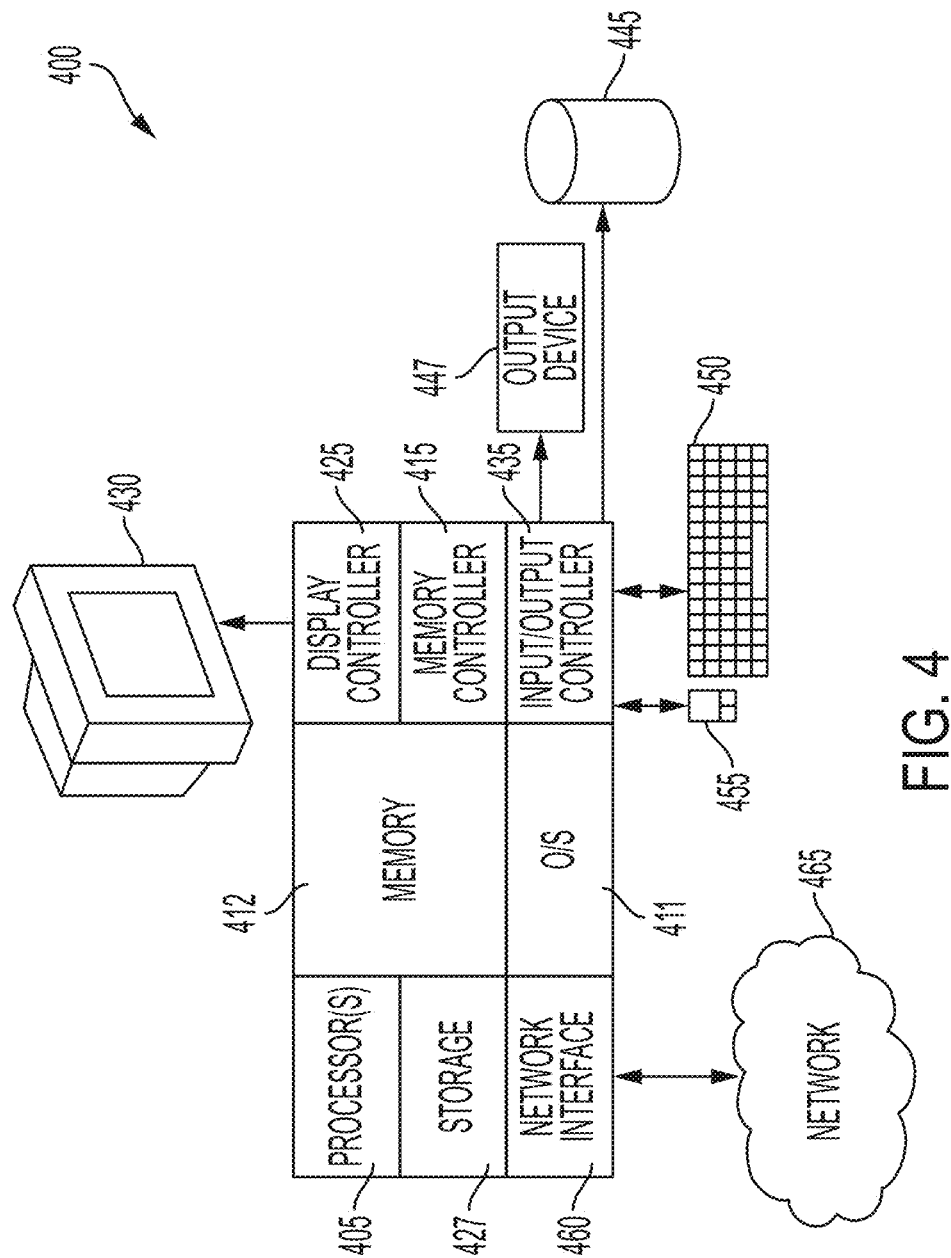
FIG. 4 is a block diagram of a computer system for implementing some or all aspects of a method for gradually throttling memory due to dynamic conditions in accordance with one or more embodiments of the present invention.

Turning now to FIG. 4, a block diagram of a computer system 400 for implementing some or all aspects of a method for gradually throttling memory due to dynamic conditions is generally shown in accordance with one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 400, such as a mobile device, personal computer, workstation, minicomputer, or mainframe computer.

In an exemplary embodiment, as shown in FIG. 4, the computer system 400 includes a processor 405, memory 412 coupled to a memory controller 415, and one or more input devices 445 and/or output devices 447, such as peripherals, that are communicatively coupled via a local I/O controller 435. These devices 447 and 445 may include, for example, a printer, a scanner, a microphone, and the like. A conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 447, 445 may further include devices that communicate both inputs and outputs, for instance disk and tape storage, a network interface card (NIC) or modulator/ demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 412. The processor 405 may be a custom made or commercially available processor, a central processing unit (CPU), an auxiliary processor among several processors associated with the computer system 400, a semiconductor based microprocessor (in the form of a microchip or chip set), a microprocessor, or other device for executing instructions. The processor 405 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 412 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 412 may incorporate electronic, magnetic, optical, or other types of storage media. Note that the memory 412 may have a distributed architecture, where various components are situated remote from one another but may be accessed by the processor 405.

The instructions in memory 412 may include one or more separate programs, each of which comprises an ordered listing of executable instructions for implementing logical functions. In the example of FIG. 4, the instructions in the memory 412 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 427, which may be a storage device such as a hard disk drive or solid state drive. The stored instructions in memory 412 or in storage 427 may include those enabling the processor to execute one or more aspects of the dispatch systems and methods of this disclosure.

The computer system 400 may further include a display controller 425 coupled to a display 430. In an exemplary embodiment, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In an exemplary embodiment, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for gradually throttling memory due to dynamic conditions as described herein can be embodied, in whole or in part, in computer program products or in computer systems 400, such as that illustrated in FIG. 4.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by pre-fetch throttling logic, a pre-fetch command requesting data from a memory and a priority level of the pre-fetch command, the priority level selected from a plurality of priority levels and assigned to the pre-fetch command based at least in part on a likelihood that data requested by the pre-fetch command will be utilized by a processor;
receiving, by the pre-fetch throttling logic, thermal condition data from one or more sensors;
determining, by the pre-fetch throttling logic, whether the pre-fetch command should be issued to the memory, the determining based at least in part on the priority level of the pre-fetch command and the thermal condition data;
issuing the pre-fetch command to the memory based at least in part on determining that the pre-fetch command should be issued to the memory; and
preventing the pre-fetch command from being issued to the memory based at least in part on determining that the pre-fetch command should not be issued to the memory.

2. The computer-implemented method of claim 1, wherein the plurality of priority levels comprise a first level corresponding to a first likelihood that the data requested by the pre-fetch command will be utilized by the processor, a second level corresponding to a second likelihood higher than the first likelihood that the data requested by the pre-fetch command will be utilized by the processor, and a third level corresponding to a third likelihood higher than the second likelihood that the data requested by the pre-fetch command will be utilized by the processor.

3. The computer-implemented method of claim 2, wherein the plurality of priority levels further comprise a fourth level corresponding to a fourth likelihood higher than the third likelihood that the data requested by the pre-fetch command will be utilized by the processor.

4. The computer-implemented method of claim 1, wherein the one or more sensors include temperature sensors.

5. The computer-implemented method of claim 1, wherein a sensor of the one or more sensors is located on the memory.

6. The computer-implemented method of claim 1, wherein a sensor of the one or more sensors is located on the processor.

7. The computer-implemented method of claim 1, wherein the pre-fetch throttling logic is executed by a memory controller.

8. The computer-implemented method of claim 1, wherein the pre-fetch throttling logic is executed by one or both of the processor and a cache.

9. A system comprising:
a memory having computer readable instructions; and
one or more processing units for executing the computer readable instructions, the computer readable instructions controlling the one or more processing units to perform operations comprising:
receiving, by pre-fetch throttling logic, a pre-fetch command requesting data from a memory and a priority level of the pre-fetch command, the priority level selected from a plurality of priority levels and assigned to the pre-fetch command based at least in part on a likelihood that data requested by the pre-fetch command will be utilized by a processor;
receiving, by the pre-fetch throttling logic, thermal condition data from one or more sensors;
determining, by the pre-fetch throttling logic, whether the pre-fetch command should be issued to the memory, the determining based at least in part on the priority level of the pre-fetch command and the thermal condition data;
issuing the pre-fetch command to the memory based at least in part on determining that the pre-fetch command should be issued to the memory; and
preventing the pre-fetch command from being issued to the memory based at least in part on determining that the pre-fetch command should not be issued to the memory.

10. The system of claim 9, wherein the plurality of priority levels comprise a first level corresponding to a first likelihood that the data requested by the pre-fetch command will be utilized by the processor, a second level corresponding to a second likelihood higher than the first likelihood that the data requested by the pre-fetch command will be utilized by the processor, and a third level corresponding to a third likelihood higher than the second likelihood that the data requested by the pre-fetch command will be utilized by the processor.

11. The system of claim 10, wherein the plurality of priority levels further comprise a fourth level corresponding to a fourth likelihood higher than the third likelihood that the data requested by the pre-fetch command will be utilized by the processor.

12. The system of claim 9, wherein the one or more sensors include temperature sensors.

13. The system of claim 9, wherein a sensor of the one or more sensors is located on the memory.

14. The system of claim 9, wherein a sensor of the one or more sensors is located on the processor.

15. The system of claim 9, wherein the pre-fetch throttling logic is executed by a memory controller.

16. The system of claim 9, wherein the pre-fetch throttling logic is executed by one or both of the processor and a cache.

17. A computer program product comprising a non-transitory computer readable storage medium having program instructions embodied therewith, the program instructions executable by one or more processing units to cause the processing units to perform operations comprising:
receiving, by pre-fetch throttling logic, a pre-fetch command requesting data from a memory and a priority level of the pre-fetch command, the priority level selected from a plurality of priority levels and assigned to the pre-fetch command based at least in part on a likelihood that data requested by the pre-fetch command will be utilized by a processor;
receiving, by the pre-fetch throttling logic, thermal condition data from one or more sensors;
determining, by the pre-fetch throttling logic, whether the pre-fetch command should be issued to the memory, the determining based at least in part on the priority level of the pre-fetch command and the thermal condition data;
issuing the pre-fetch command based at least in part on determining that the pre-fetch command should be issued to the memory; and
preventing the pre-fetch command from being issued to the memory based at least in part on determining that the pre-fetch command should not be issued to the memory.

18. The computer program product of claim 17, wherein the plurality of priority levels comprise a first level corresponding to a first likelihood that the data requested by the pre-fetch command will be utilized by the processor, a second level corresponding to a second likelihood higher than the first likelihood that the data requested by the pre-fetch command will be utilized by the processor, and a third level corresponding to a third likelihood higher than the second likelihood that the data requested by the pre-fetch command will be utilized by the processor.

19. The computer program product of claim 17, wherein the pre-fetch throttling logic is executed by a memory controller.

20. The computer program product of claim 17, wherein the pre-fetch throttling logic is executed by one or both of the processor and a cache.

* * * * *